United States Patent
Darbishire et al.

(12) 
(10) Patent No.: US 6,712,415 B1
(45) Date of Patent: Mar. 30, 2004

(54) EASY TO INSTALL PULL OUT CARGO-CARRYING TRAY FRAME FOR PICKUP TRUCKS

(75) Inventors: R. Alan Darbishire, Powell, TN (US); John B. Organ, Alpharetta, GA (US)

(73) Assignee: Durakon Acquisition Corp., Lapeer, MI (US)

( * ) Notice: Subject to any disclaimer, the term of this patent is extended or adjusted under 35 U.S.C. 154(b) by 0 days.

(21) Appl. No.: 09/825,131

(22) Filed: Apr. 3, 2001

Related U.S. Application Data

(60) Provisional application No. 60/194,577, filed on Apr. 5, 2000.

(51) Int. Cl.$^7$ .............................. B60R 11/00; B60R 9/00
(52) U.S. Cl. ...................................... 296/37.1; 276/37.6
(58) Field of Search .............................. 296/37.1, 37.6, 296/26.09, 26.08; 414/522; 410/77, 80

(56) References Cited

U.S. PATENT DOCUMENTS

| | | | | |
|---|---|---|---|---|
| 2,612,384 A | * | 9/1952 | Wiegman | 296/26.09 |
| 4,824,158 A | * | 4/1989 | Peters et al. | 296/37.6 |
| 4,883,302 A | * | 11/1989 | McCain | 296/37.1 |
| 4,944,544 A | * | 7/1990 | Dick | 296/37.1 |
| 4,946,215 A | * | 8/1990 | Taylor | 296/37.6 |
| 5,064,335 A | | 11/1991 | Bergeron et al. | 414/522 |
| 5,083,828 A | * | 1/1992 | Accettura | 296/37.6 |
| 5,090,335 A | * | 2/1992 | Russell | 296/24.1 |
| 5,605,264 A | * | 2/1997 | Neal | 296/37.6 |
| 5,988,722 A | * | 11/1999 | Parri | 296/26.09 |
| 6,039,521 A | * | 3/2000 | Sullivan | 410/118 |
| 6,079,741 A | * | 6/2000 | Maver | 296/37.6 |
| 6,149,040 A | * | 11/2000 | Walker | 296/37.1 |
| 6,224,128 B1 | * | 5/2001 | Mains | 296/37.6 |
| 6,328,364 B1 | * | 12/2001 | Darbishire | 296/26.09 |

FOREIGN PATENT DOCUMENTS

| | | | | |
|---|---|---|---|---|
| CH | 663586 | * | 12/1987 | 296/26.09 |
| GB | 2244031 | * | 11/1991 | 296/26.09 |
| GB | 2247651 | * | 3/1992 | 296/37.1 |
| JP | 1-244936 | * | 9/1989 | 296/37.1 |
| WO | 90/14251 | * | 11/1990 | 296/37.1 |

OTHER PUBLICATIONS

Darbishire, U.S. utility patent application No. 09/506,057 filed on Feb. 17, 2000 A.D.
Darbishire & Organ, U.S. provisional patent application No. 60/194,577 filed on Apr. 5, 2000 A.D.

* cited by examiner

*Primary Examiner*—D. Glenn Dayoan
*Assistant Examiner*—M. Gutman
(74) *Attorney, Agent, or Firm*—Christopher John Rudy

(57) ABSTRACT

An easy to install pull out cargo-carrying tray frame device includes a stationary frame to which is attached a wedgeable attachment member that can be employed to secure the stationary frame to a cargo area of a vehicle or trailer. The device can be part of an extendible drawer or tray device, and can be especially adaptable for a pickup truck. An extension can extend laterally from the stationary frame, to which the wedgeable attachment member can be attached, so that the stationary frame can be secured to the cargo area, and the wedgeable attachment member can be vertically oriented and extensible. The lateral extension member can have a sliding-interlocking relationship with an engagement member to which the wedgeable attachment member can be adjustably attached. Alternatively, the wedgeable attachment member can extend in a horizontal direction to engage and be wedged between side walls of the vehicle or trailer cargo area. A plurality of wedgeable attachment members can be present.

22 Claims, 2 Drawing Sheets

US 6,712,415 B1

EASY TO INSTALL PULL OUT CARGO-CARRYING TRAY FRAME FOR PICKUP TRUCKS

CROSS-REFERENCE CLAIM OF PRIORITY

This claims benefit under 35 USC 119(e) of U.S. provisional patent application No. 60/194,577 filed on Apr. 5, 2000 A.D. The complete specification of that application is incorporated herein by reference.

FIELD

The present invention concerns a pull out cargo-carrying tray frame and tray frame assembly for pickup trucks and like vehicles useful in connection with loading and transport of cargo.

BACKGROUND

Various extendible drawer or tray devices are known for easing the burden of loading and unloading cargo. See, e.g., Darbishire, U.S. patent application Ser. No. 09/506,057 filed on Feb. 17, 2000 A.D., the complete specification of which is incorporated herein by reference. The '057 application issued as U.S. Pat. No. 6,328,364 B1. As useful as such devices are for their intended purpose, especially the devices of the '057 application, installation of the same usually requires drilling and screwing, or welding or modification of the cargo bed of the pickup truck. Although the known installation procedures can be relatively simple for the skilled home or professional mechanic, they do take time, and can invade the integrity of the pickup truck bed. As well, removal of the cargo-carrying device, if so desired or even possible, could involve removal of rusty nuts and bolts, which is itself an unpleasant task, leaving exposed holes in the bed of the pickup truck.

It would be desirable to simplify installation of the extendible drawer or tray devices. It would be further desirable to be able to provide a less invasive way to install the same.

SUMMARY

The present invention provides an easy to install pull out cargo-carrying tray frame comprising a stationary frame to which is attached a wedgeable attachment member that can be employed to secure the frame to a cargo area of a vehicle or trailer. The invention is especially adaptable for pickup trucks.

The invention is useful in cargo management.

Significantly by the invention, installation of a stationary frame for, or typically as the ultimate goal, installation of an extendible drawer or tray device in which the frame is a part, is dramatically simplified. Moreover, the installation is generally non-invasive, which results in few if any holes being drilled in or welds applied to the cargo bed, and removal of the frame or device with the frame can be readily accomplished. The invention nonetheless can secure the frame and its attendant drawer or tray device with assurance.

Numerous further advantages attend the invention.

DRAWINGS

The drawings form part of the specification hereof. With respect to the drawings, which are not necessarily drawn to scale, the following is briefly noted:

ILLUSTRATIVE DETAIL

Figure 1:
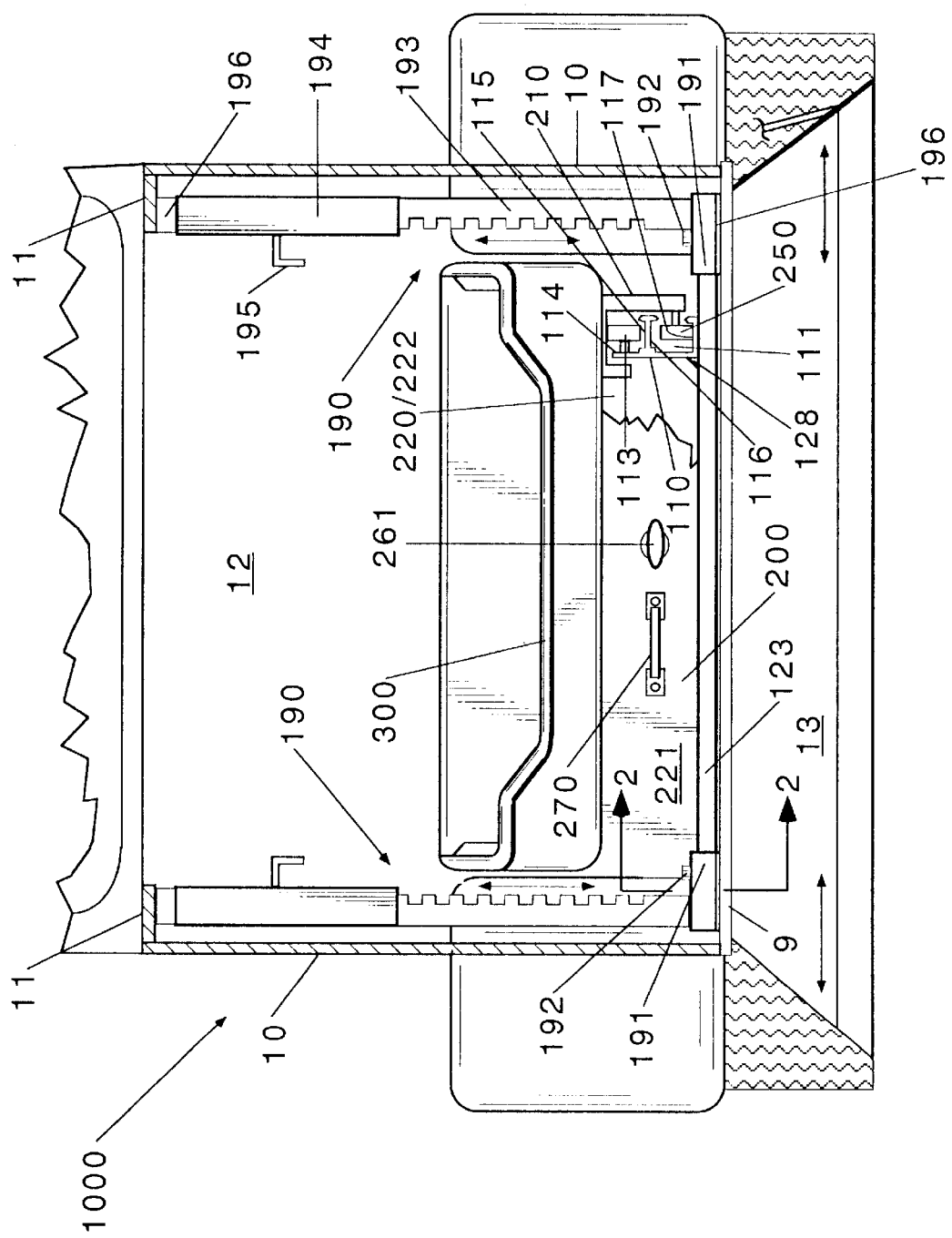
FIG. 1 is a rear plan view, in partial section, of an easy to install cargo-carrying tray frame and extendible drawer device of the invention, mounted to the bed of a pickup truck.

The invention can be further understood by the present detail, which may be read in view of the drawings. The same is to be taken in an illustrative, and not necessarily limiting, sense.

With respect to the drawings, easy to install, pull out or extendible, cargo-carrying drawer or tray device 1000 is depicted as being mounted on bed 9 of a pickup truck having a cargo area defined in part by the bed 9; side walls 10, each of which have wall overhang 11; front or cab end wall 12; and tailgate 13. In general, stationary frame 100, which is shown as mounted in the cargo area, is in extendible, sliding and/or rolling attachment with movable frame 200. Attached to the frame 200 can be tray or drawer 300 or other type of cargo-supporting member such as a flat board and so forth, on which cargo may be placed.

Beneficially, the interacting frames 100, 200 are foundationally such as disclosed in the referenced '057 application, thus, say, with the frame 100 including a pair of parallel, longitudinally directed side rails 110 with inwardly facing roller tracks or channels 111. Roller stopping block(s) 112 may be provided at the superficial or "tailgate" (rear) end of the rail 110 to help keep the rolling frame 200 from becoming separated from the base frame 100 during extension. Mounted generally above the roller track 111 are sets of spinnable bearings (upper, tray-supporting rollers) 113, say, of steel. Preferably, the rail 110 is in the form of an inverted F-channel, which has above the lower roller track 111 vertically extending face 114 and upper roller track 115 defined by central horizontally extending portion 116, and a lower horizontally extending portion. To and in the upper vertically extending face 114, the rollers 113 are mounted and spin. A suitable number of the upper rollers 113 are provided, beneficially, for example, four, in sets of two each mounted near the rear end of the rail 110 upper vertical inner face, say, at about a 16-inch or so distance apart in prepositioned mounting holes such as with one upper roller 113 mounted an inch or so from the rear end of the rail 110, and the other roller 113 mounted seventeen inches or so from the rear end of the rail 110. The roller tracks 111 can accommodate drawer frame rollers 250, say, of steel. A suitable number of cross-members 120, say, three to five, are secured to the rails 110 to hold them in place, generally with more cross-members 120 in the longer systems, and the cross-members 120 can take various forms and have various dimensions. For example, cross-member 121 can be L-shaped and be for mounting at the front or "deep" or cab end of the frame 100; cross-member 122 can be next, followed by cross-members 123 & 124, the latter to be mounted at the rear or "superficial" or tailgate end of the frame 100; the cross-members 122, 123, 124 may have an inverted U-shaped cross-section, for example, or, say, have a rectangular cross-section, and so forth. Optional mounting holes 125 may be provided inside the rails 110 in the cross-members 120. Resilient, shock-absorbing pads 126 may be provided on rearward facing surfaces of the L-shaped cross-member 121 so as to cushion the impact of the frames 100, 200 when the system is fully closed, and/or resilient, shock-absorbing pads 127 may be provided on the frontward facing surface of the stop block 112 so as to cushion the impact of the frames 100, 200 when the system 1000 is fully opened. The pads 126, 127 can be made of a rubber, rubbery synthetic plastic, cork, or the like. The rails 110 can be mounted to the cross-members 120 by any suitable means such as screwing, riveting, gluing, and so forth; an excellent way to mount the rails 110 to the cross-members 120, however, is through metal to metal welds 128. As a further alternative, the rail and cross-member assembly 110/120 may be made monolithically. Base mounting tabs 130 external to the rail 110 may be provided such as by extensions of cross-members 120, or, as an alternative, by attaching mounting tabs separate from a cross-member. The tabs 130 may have optional outside mounting holes 130H formed therein in addition to or in lieu of any inside mounting holes 125. An advantageous feature of the frame 110 is that it can be "ramped" so that, in general, the deep (front or "cab") end of the frame is mounted closer to the suitable mounting surface (pickup truck, van, trailer bed, etc.) than is the superficial (rear or "tailgate") end. This ramping can be accomplished by having external mounting tabs 130 offset more and more from the rails 110 or, more preferably, having successively thicker cross-members 120 supporting the rails 110, for example, providing the cross-member 121 with a ¼-inch thickness, the cross-member 122 with a ⅜-inch thickness, the cross-member 123 with a ½-inch thickness, and the cross-member 124 with a ⅝-inch thickness. The ramp gradient can keep the drawer frame from hitting certain tailgates of certain model pickup trucks, for example, and more, it can bias a drawer frame and tray assembly 200, 300 toward the closed position and assist in closing. Furthermore, it may help keep spills in the tray 300 until a suitable grade is found to drain them as noted further in additionally following description. Inside roller bearing mounting holes may be provided in a cross-member 120, for example, in one nearest the superficial (rear or "tailgate") end such as the cross-member 124, so that a pair of inside roller bearing wheels 151, of steel, may be mounted thereby to guide the drawer frame 200, which itself may swing slightly from side to side, and reduce friction when opening and closing the drawer frame assembly 200, 300 rollingly attached to the stationary frame 100. In general, the rollers 113, 151 & 250 are provided with suitable tolerances so as to permit proper rolling action during extension and retraction of the frames 100, 200. Locking pin-engaging ramps or wedges 163 may be provided on the inner face 114 of the rail between the wheels 113 and front end of the rail 110, in opposing sets, front set 163F near the front (deep or "cab") end of the rail with the widest part of the wedge closest to the front of the rail 110, and rear set 163R in front of the set of wheels 113 with the widest part of the wedge closest to the rear of the rail 110. Middle set 163M may also be provided; however, when it is, care should be taken to keep the locking system disengaged when it passes by the ramps 163M if it is desired to not stop there. In general, front and rear locking pin-engaging ramps 163F, 163R alone are often provided. These ramps 163, which may be of any suitable material and may have a hardened face, can be employed in lieu of holes, the holes being a viable alternative, for engaging spring-loaded, sliding pin of a corresponding locking system with retractable pins or pegs on the front part of movable frame 200 and may be attached, say, by riveting, welding, or in any other suitable manner. Riveting of the ramps 163 is beneficially provided as the rivets are easily installed at the factory, and, should a ramp 163 become disengaged, the home-repairman may fix this with a nut and bolt. Alternatively, the ramps 163 may be provided by being formed monolithically with the rail 110. The movable drawer frame 200 thus includes inverted J-shaped side rails 210 and cross-members 220, which are suitably attached, say, welded together. Alternatively, the frame 200 including the rails 210 and the cross-members 220, may be constructed by screwing its component parts together, riveting, gluing, and so forth, or may provided by being formed monolithically. A suitable number, say, from three to seven, cross-members 220 are employed, generally with more cross-members 220 in the longer systems; for example, there may be provided five cross-members 220: one a rear-facing cross-member 221, which may generally have a rotated-L (or gamma) cross section, and four remaining cross-members 222, which may generally have an inverted-U shape. With respect to the inverted J-shaped side rails 210, each rail 210 can have a depending, wheel-mounting portion; a depending, rail-aligning portion, which is typically shorter than the depending, wheel-mounting portion; and an upper, tray-mounting and supporting portion, which is generally non-depending but co-planar with the tray 300, and typically against and under which upper, tray-mounting and supporting portion the upper set of rollers 113 mounted on the inner face of the side rail 110 of the stationary frame 110 rollingly engage so as to directly support the upper, tray-mounting and supporting portion as well as the tray 300. To the side rails 210 are attached a number of the roller bearing wheels 250, again say, of steel, mounted for tracking in the roller tracks 111 of the base frame rails 110. For example, four rollers 250 may be so mounted, one set of two by each of the two front corners of the side rails 210. The inverted J-shaped side rails 210 engage appropriately with the base frame side rails 110, and act otherwise much like a cabinet drawer set up. However, when the frames 100, 200 are closed in the system, the weight in the tray 300 is supported in an upward fashion by the rollers 113 while the rollers 250 support the tray upwardly by having their weight borne in the lower horizontally extending portion 117 defining the channel 111; when the system is extended, the weight in the tray is supported in an upward fashion by the rollers 113 while pressure from the upper portion of the rollers 250 in the central horizontally extending portion 116 defining the channel 111 is applied to support the extended load, in a quasi-lever action. Stops are typically provided in the moving frame side rails 210, say, one per rail, to engage the stop blocks 112 and keep the movable frame 200 from being pulled away from the stationary frame 100 when the frame 200 is extended. The stops can be of any suitable material, say, steel, and mounted in any suitable manner, say, by screwing into the rails 210; alternatively, the stops may have a resilient, shock-absorbing coating in lieu of or in addition to the resilient, shock-absorbing pads 127, and may be employed for the same purpose. Drawer locking subsystem can keep the drawer frame and tray assembly 100, 200, 300 in locked position, and can be unlocked for extension of the tray for loading or unloading. Rearward facing knob or handle 261 attached to a communicating link such as a cable, chain, rod or the like may be pulled to pull and activate to open the locking arrangement, which can be of the spring-loaded, sliding pin or peg type, the same engaging and sliding up the front or rear ramp 163F/163R to drop off after it passes the widest part of the wedge 163 to secure it in locked position. Pulling the handle 261 releases the pin by pulling it in so that it may pass the wedge 163 for free movement until it again rides up a wedge 163 and locks. Preferably, the link is a cable which has a split therein so that a plurality, say, a pair, of locking arrangements which are provided are simultaneously activated. The cable may be threaded through holes in the cross-members 220. The locking subsystem is simple and effective in all types of typically encountered environments, to include under dirty conditions as well as not dirty conditions. When the drawer is closed, the peg again with its spring or other means biased adaptation enters the corresponding peg-mating space beyond the wedge 163 or a hole to lock the drawer in its closed position so that it cannot be extended accidentally. Other locking features may be employed to include use of switch activated solenoid locks and so forth and the like. Pull out handle 270 is generally provided, and the pull out handle 270 may be separate, of the loop variety, and placed alongside the knob 261 for good control of movement during extension and retraction, particularly when heavily loaded. The stationary and movable frame assembly 100, 200 may have its inverted F-channel and inverted J-channel sets arranged in a 180-degree relationship to that illustrated in FIG. 1. Compare, the specification drawings from the '057 application.

Figure 2A:
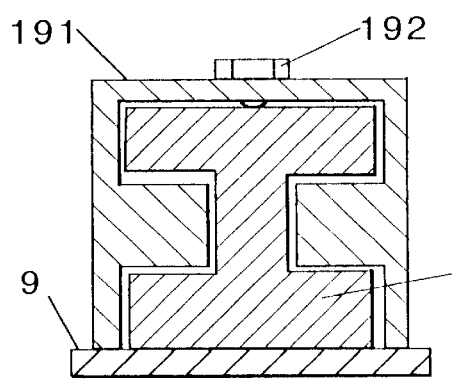
FIG. 2 shows cross-sectional views of some interlocking slide bars (A & B) of the invention, generally taken in section along 2—2 as found in FIG. 1.
Figure 2B:
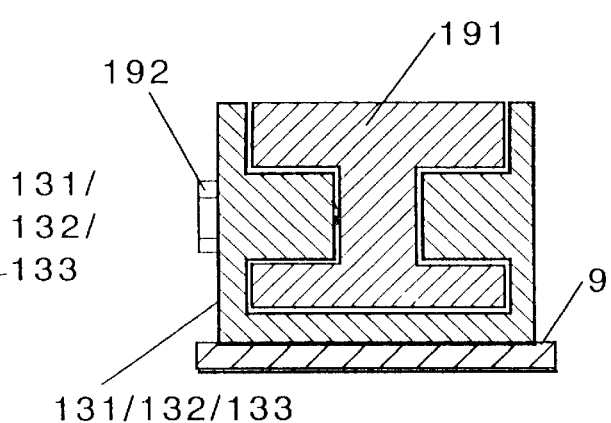
Figure 3:
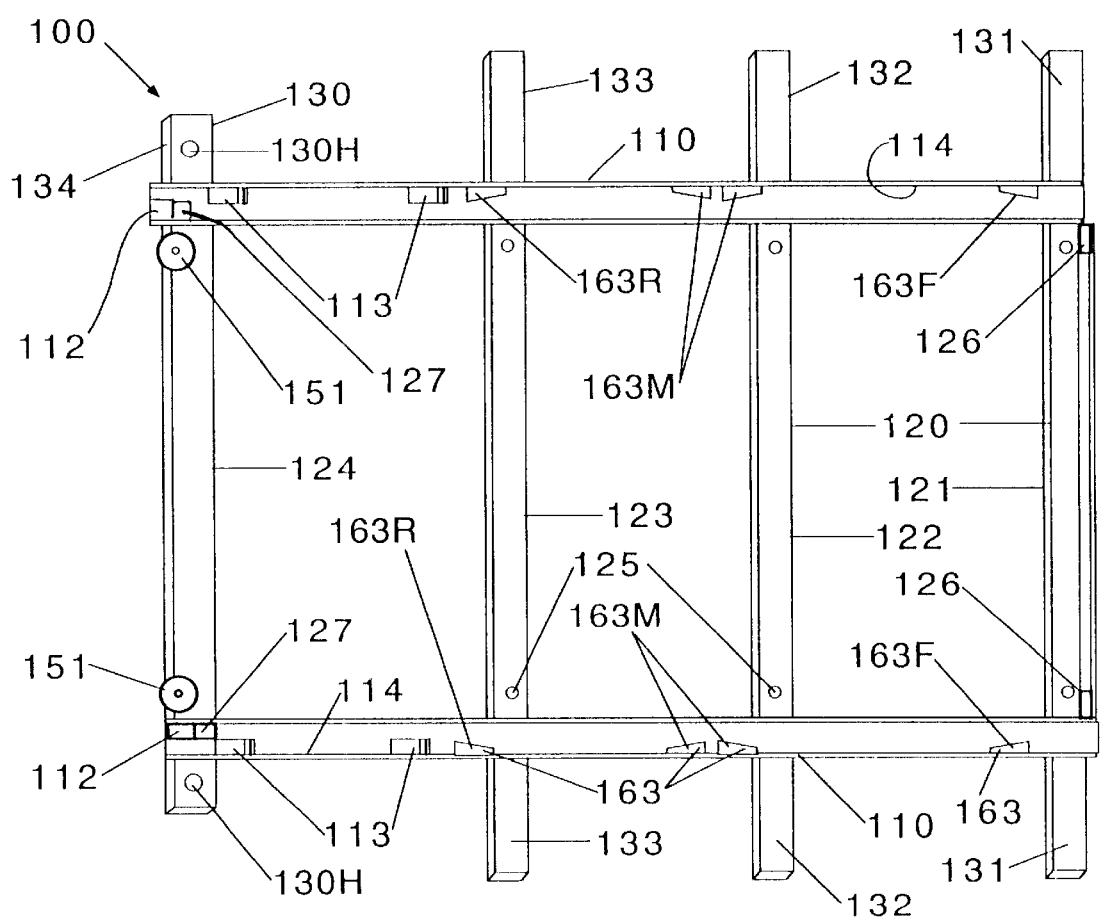
FIG. 3 is a top view, slightly from the rear, of a stationary frame itself, to which can be attached a wedgeable attachment member that can be employed to secure the frame to the cargo area of the pickup truck as generally found in FIG. 1.

Building upon such a foundation, or in another type of stationary frame suitable for the purpose, in the device 1000, extensions 131, 132, 133 extend laterally from the frame 100. These may be in the form of an I-beam (FIG. 2A) or other other suitable form for sliding-interlocking relationship with an engagement member so that wedgeable attachment member 190 can be adjustably attached to the frame 100 so that the frame 100 can be secured to the cargo area of the pickup. The engagement member can be a corresponding engagement sleeve 191, for example, in the form of an I-beam sleeve (FIG. 2A), which can slide laterally in relation to the extension 131, 132, 133 to which it is attached. The extension 131, 132, 133 can be in the form of an I-beam engaging sleeve, with the engagement member 191 the I-beam (FIG. 2B). Set screw 192 or other stop contrivance such as a cam-action handle, wedge, and so forth, can keep the extension 131, 132, 133 and sleeve 191 assembly from further sliding when it is adjusted to the proper dimension for fitting the wedgeable attachment member 190 to the cargo area of the vehicle or trailer. Vertical post member 193, for example, a notch-containing jack post type elongate member, is attached to the sleeve 191, for example, by welding, or by other suitable methods such as screwing, clamping, gluing, and so forth; to the post member 193 is assembled extension mechanism 194, for example, jacking head, which may be operated by jack handle 195. The wedgeable attachment member 190 is expanded or extended until it is wedged firmly between the bed 9 and the overhang 11 to set the stationary frame 100 and usually the entire extendible, pull out drawer system 1000 as well, in the cargo area. Resilient pads 196 may protect vehicle cargo bay surfaces. Other extendible, wedgeable mechanisms or contrivances may be employed. For example, in lieu of or in addition to the ratcheting or jack type device, can be provided an extending, screw pole arrangement; a cam handle type wedging arrangement; a pneumatic or hydraulic extending arrangement; and so forth. As well, in lieu of or in addition to the vertically functioning arrangement of FIG. 1, may be provided a horizontally functioning arrangement where wedgeable attachment member(s) extend(s) in a horizontal direction, say, to engage and be wedged between the side walls 10. At least one wedgeable attachment member 190 is present; advantageously a plurality of the members 190 are supplied and employed in the practice of the invention. For example, six members 190 can be employed, one on each of the two extensions formed about or from the cross members 121, 122, 123 (FIG. 3).

Of course, as alluded to above, other types of frames than the Darbishire '057 type frame can be adapted within the practice of the present invention.

CONCLUSION

The present invention is thus provided. Various features, parts, subcombinations and combinations can be practiced with or without reference to other features, parts, subcombinations or combinations in the practice of the invention, and numerous adaptations and modifications can be effected within its spirit, the literal claim scope of which is particularly pointed out as follows.

We claim:

1. An easy to install pull out cargo-carrying tray frame device comprising a stationary frame, which is part of an extendible drawer or tray assembly, which assembly includes a stationary rail having a first set of rollers mounted thereon, said rail adapted for receiving a second set of rollers, as part of the stationary frame, and a movable rail having the second set of rollers mounted thereon, wherein the movable rail is mounted to the stationary rail with rolling contact both between the first set of rollers and the movable rail and between the stationary rail and the second set of rollers; and to which said stationary frame is attached at least one wedgeable attachment member that can be employed to secure the stationary frame to a cargo area of a conveyance selected from the group consisting of a vehicle and a trailer by generally non-invasive wedging pressure from extension of the wedgeable attachment member between opposing surfaces of the cargo area.

2. The device of claim 1, wherein the at least one wedgeable attachment member includes at least one vertically oriented component which is extensible vertically and at least one horizontally oriented component which is extensible horizontally.

3. An easy to install pull out cargo-carrying tray frame device especially adaptable for a pickup truck comprising a stationary frame, which is part of an extendible drawer or tray assembly, and to which said stationary frame is attached at least one wedgeable attachment member that can be employed to secure the stationary frame to a cargo area of the pickup truck by generally non-invasive wedging pressure from extension of the wedgeable attachment member between opposing surfaces of said cargo area, wherein the extendible drawer or tray assembly includes at least one of the following:

a stationary rail having a first set of rollers mounted thereon, said rail adapted for receiving a second set of rollers, as part of the stationary frame; and a movable rail having the second set of rollers mounted thereon, wherein the movable rail is mounted to the stationary rail with rolling contact both between the first set of rollers and the movable rail and between the stationary rail and the second set of rollers; and a first, pull out end, and a second end opposing said first end, including the stationary frame; a movable frame in cooperation therewith; and a load-bearing surface mounted to the movable frame—wherein the stationary frame is ramped so that the assembly is higher on the pull out end than on the opposing end.

4. The device of claim 3, wherein the wedgeable attachment member includes a vertically oriented component that is extensible vertically so that the stationary frame can be further secured to said cargo area.

5. The device of claim 3, wherein the wedgeable attachment member includes a laterally oriented component that is extensible laterally so that the stationary frame can be secured to said cargo area.

6. An easy to install pull out cargo-carrying tray frame device comprising a stationary frame, which is part of an extendible drawer or tray assembly, and to which said stationary frame is attached at least one wedgeable attachment member which can be employed to secure the stationary frame to a cargo area of a conveyance selected from the group consisting of a vehicle and a trailer by generally non-invasive wedging pressure from extension of the wedgeable attachment member between opposing surfaces of the cargo area, wherein the extendible drawer or tray assembly includes at least one of the following:

a stationary rail having a first set of rollers mounted thereon, said rail adapted for receiving a second set of rollers, as part of the stationary frame; and a movable rail having the second set of rollers mounted thereon, wherein the movable rail is mounted to the stationary rail with rolling contact both between the first set of rollers and the movable rail and between the stationary rail and the second set of rollers; and a first, pull out end, and a second end opposing said first end, including the stationary framer a movable frame in cooperation therewith; and a load-bearing surface mounted to the movable frame—wherein the stationary frame is ramped so that the assembly is higher on the pull out end than on the opposing end.

7. The device of claim 6, wherein the extendible drawer or tray assembly includes said stationary and movable rails, wherein:

said stationary rail is part of a set of parallel rails having the first set of rollers mounted thereon and adapted for receiving the second set of rollers; and said movable rail is part of a subcombination having a movable frame having the second set of rollers mounted thereon, and a load-bearing surface mounted to the movable frame;

and the movable frame and load-bearing surface subcombination is mounted to the stationary frame with rolling contact both between the first set of rollers and the movable frame and between the set of parallel rails and the second set of rollers.

8. The device of claim 7, wherein:

said parallel rails are in a form of inverted F-channels; and said subcombination having the movable frame includes a set of parallel side rails, each in a form of an inverted J-channel, on which the second set of rollers is mounted.

9. In combination, a pickup truck having a cargo area; and, mounted thereto, an easy to install pull out cargo-carrying tray frame device having a stationary frame, which is part of an extendible drawer or tray assembly, and to which said stationary frame is attached at least one wedgeable attachment member that secures the stationary frame to said cargo area by generally non-invasive wedging pressure from extension of the wedgeable attachment member between opposing surfaces of said cargo area, wherein the extendible drawer or tray assembly includes at least one of the following:

a stationary rail having a first set of rollers mounted thereon, said rail adapted for receiving a second set of rollers, as part of the stationary frame; and a movable rail having the second set of rollers mounted thereon, wherein the movable rail is mounted to the stationary rail with rolling contact both between the first set of rollers and the movable rail and between the stationary rail and the second set of rollers; and a first, pull out end, and a second end opposing said first end, including the stationary frame; a movable frame in cooperation therewith; and a load-bearing surface mounted to the movable frame—wherein the stationary frame is ramped so that the assembly is higher on the pull out end than on the opposing end.

10. The combination of claim 9, wherein the wedgeable attachment member includes both a laterally oriented component that is extensible laterally from the stationary frame and a vertically oriented component that is extensible vertically so that the stationary frame is secured to said cargo area.

11. In combination, a conveyance selected from the group consisting of a vehicle and a trailer having a cargo area; and, mounted thereto, an easy to install pull out cargo-carrying device comprising a stationary frame, which is part of an extendible drawer or tray assembly, and to which said stationary frame is attached at least one wedgeable attachment member that can be employed to secure the stationary frame to the cargo area of said conveyance by generally non-invasive wedging pressure from extension of the wedgeable attachment member between opposing surfaces of the cargo area, wherein the extendible drawer or tray assembly includes at least one of the following:

a stationary rail having a first set of rollers mounted thereon, said rail adapted for receiving a second set of rollers, as part of the stationary frame; and a movable rail having the second set of rollers mounted thereon, wherein the movable rail is mounted to the stationary rail with rolling contact both between the first set of rollers and the movable rail and between the stationary rail and the second set of rollers; and a first, pull out end, and a second end opposing said first end, including the stationary frame; a movable frame in cooperation therewith; and a load-bearing surface mounted to the movable frame—wherein the stationary frame is ramped so that the assembly is higher on the pull out end than on the opposing end.

12. The combination of claim 11, wherein the wedgeable attachment member includes a horizontally oriented component which extends in a horizontal direction from the stationary frame to engage and be wedged between side walls of the cargo area of said conveyance.

13. The combination of claim 12, wherein the horizontally oriented component has a sliding-interlocking relationship with an engagement member to which the wedgeable attachment member is adjustably attached.

14. The combination of claim 11, wherein the at least one wedgeable attachment member includes a plurality of wedgeable attachment members.

15. In combination, a pickup truck having a cargo area with side walls; and, mounted thereto, an easy to install pull out cargo-carrying device comprising a stationary frame, which is part of an extendible drawer or tray assembly, and to which said stationary frame is attached at least one wedgeable attachment member that includes a vertically oriented component which extends in a vertical direction from the stationary frame to engage and be wedged between a bed surface of the cargo area and an overhang to at least one of the side walls of the cargo area of the pickup truck to secure the stationary frame to the cargo area of the pickup truck by generally non-invasive wedging pressure from extension of the wedgeable attachment member between the bed surface and the overhang of the cargo area, wherein the extendible drawer or tray assembly includes at least one of the following:

a stationary rail having a first set of rollers mounted thereon, said rail adapted for receiving a second set of rollers, as part of the stationary frame, and a movable rail having the second set of rollers mounted thereon, wherein the movable rail is mounted to the stationary rail with rolling contact both between the first set of rollers and the movable rail and between the stationary rail and the second set of rollers; and a first, pull out end, and a second end opposing said first end, including the stationary frames a movable frame in cooperation therewith; and a load-bearing surface mounted to the movable frame—wherein the stationary frame is ramped so that the assembly is higher on the pull out end than on the opposing end.

16. The combination of claim 15, wherein at least one of the at least one wedgeable attachment member includes a jacking mechanism.

17. The combination of claim 15, wherein the at least one wedgeable attachment member includes a plurality of wedgeable attachment members.

18. An easy to install pull out cargo-carrying tray frame device comprising a stationary frame to which is attached at least one wedgeable attachment member that can be employed to secure the stationary frame to a cargo area of a pickup truck by generally non-invasive wedging pressure from extension of the wedgeable attachment member between opposing surfaces of the cargo area, wherein the wedgeable attachment member includes a horizontally oriented component which extends in a horizontal direction from the stationary frame to engage and be wedged between side walls of the cargo area of the pickup truck; the horizontally oriented component has a sliding-interlocking relationship with an engagement member to which the wedgeable attachment member is adjustably attached; and an I-beam and a corresponding engagement sleeve which can slide laterally in relation thereto is included in the horizontally oriented component.

19. The device of claim 18, wherein the wedgeable attachment member includes a vertically oriented component that is extensible vertically to engage and be wedged between a bed surface of the cargo area and an overhang to at least one of the side walls of the cargo area of the pickup truck.

20. The device of claim 19, wherein the vertically oriented component is extensible by a jacking mechanism.

21. An easy to install pull out cargo-carrying device comprising a stationary frame to which is attached at least one wedgeable attachment member that can be employed to secure the stationary frame to a cargo area of a conveyance selected from the group consisting of a vehicle and a trailer by generally non-invasive wedging pressure from extension of the wedgeable attachment member between opposing surfaces of the cargo area, wherein the wedgeable attachment member has a sliding-interlocking relationship with an engagement member to which the wedgeable attachment member is adjustably attached; and an I-beam and a corresponding engagement sleeve which can slide laterally in relation thereto is included in the wedgeable attachment member.

22. The device of claim 21, wherein the stationary frame is part of an extendible drawer or tray assembly.

* * * * *